US010336304B2

(12) United States Patent
Lee et al.

(10) Patent No.: US 10,336,304 B2
(45) Date of Patent: Jul. 2, 2019

(54) BRAKE SYSTEM FOR VEHICLE

(71) Applicants: Hyundai Motor Company, Seoul (KR); Kia Motors Corporation, Seoul (KR)

(72) Inventors: Joung Hee Lee, Suwon-si (KR); Jong Yun Jeong, Hwaseong-si (KR); Dong Yoon Hyun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/696,021

(22) Filed: Sep. 5, 2017

(65) Prior Publication Data

US 2018/0186353 A1  Jul. 5, 2018

(30) Foreign Application Priority Data

Jan. 3, 2017  (KR) .................. 10-2017-0000491

(51) Int. Cl.
| | |
|---|---|
| *B60T 8/40* | (2006.01) |
| *B60T 13/16* | (2006.01) |
| *B60T 8/94* | (2006.01) |
| *B60T 13/14* | (2006.01) |
| *B60T 8/24* | (2006.01) |

(Continued)

(52) U.S. Cl.
CPC ............... *B60T 8/94* (2013.01); *B60T 7/042* (2013.01); *B60T 8/246* (2013.01); *B60T 8/4022* (2013.01); *B60T 8/4031* (2013.01); *B60T 8/4081* (2013.01); *B60T 13/146* (2013.01); *B60T 13/166* (2013.01); *B60T 13/745* (2013.01); *B60T 8/267* (2013.01); *B60T 2270/402* (2013.01)

(58) Field of Classification Search
CPC .... B60T 8/4022; B60T 8/4031; B60T 8/4072; B60T 13/16; B60T 13/161; B60T 13/165; B60T 13/166; B60T 13/74; B60T 13/741; B60T 7/042; B60T 8/17; B60T 8/176; B60T 8/40; B60T 8/4004; B60T 8/4009; B60T 8/4018; B60T 13/10
See application file for complete search history.

(56) References Cited

U.S. PATENT DOCUMENTS

| | | | |
|---|---|---|---|
| 6,315,370 B1 * | 11/2001 | Feigel | B60T 7/042 303/113.4 |
| 6,899,403 B2 * | 5/2005 | Isono | B60T 8/4018 303/11 |

(Continued)

FOREIGN PATENT DOCUMENTS

| | | | | |
|---|---|---|---|---|
| WO | WO-2011000602 A1 * | 1/2011 | ............ | B60T 8/4031 |
| WO | WO-2015074936 A1 * | 5/2015 | .............. | B60T 8/326 |

*Primary Examiner* — Thomas J Williams
(74) *Attorney, Agent, or Firm* — Morgan, Lewis & Bockius LLP

(57) ABSTRACT

A brake system for a vehicle, may include a brake input device to apply a brake input of a driver; a brake actuator generating braking hydraulic pressure; wheel cylinders generating braking force for each vehicle wheel by the braking hydraulic pressure generated by the brake actuator; and a hydraulic pressure supply line connecting the brake actuator and the wheel cylinders, wherein the brake actuator includes a main pump device by which braking force is applied, and a sub control device configured for adjusting the braking force applied by the main pump device.

19 Claims, 8 Drawing Sheets

(51) Int. Cl.
*B60T 7/04* (2006.01)
*B60T 13/74* (2006.01)
*B60T 8/26* (2006.01)

(56) References Cited

U.S. PATENT DOCUMENTS

| | | | |
|---|---|---|---|
| 9,834,188 B2* | 12/2017 | Feigel | B60T 8/326 |
| 2011/0285200 A1* | 11/2011 | Hatano | B60L 7/24 |
| | | | 303/6.01 |
| 2012/0112525 A1* | 5/2012 | Shimada | B60T 7/042 |
| | | | 303/10 |
| 2014/0224525 A1 | 8/2014 | Cagle et al. | |
| 2014/0225425 A1 | 8/2014 | Drumm et al. | |

* cited by examiner

BRAKE SYSTEM FOR VEHICLE

CROSS-REFERENCE TO RELATED APPLICATION

The present application claims priority to Korean Patent Application No. 10-2017-0000491 filed on Jan. 3, 2017, the entire contents of which are incorporated herein for all purposes by this reference.

BACKGROUND

Field of the Invention

The present invention relates to a brake system for a vehicle, and more particularly, to a brake-by-wire brake system for a vehicle which is capable of independently controlling braking force for vehicle wheels.

Description of Related Art

Recently, a brake-by-wire technology, which adopts and controls an electronic control system replacing a typical hydraulic control system known in the related art, is applied to a brake system for a vehicle.

The electronic control brake system generates required hydraulic pressure in accordance with a driver's brake intention by using an electric motor, and transmits hydraulic pressure, which is generated by an operation of the motor, to a wheel brake (wheel cylinder) of each vehicle wheel, thereby producing braking force.

Typically, the electronic control brake system, which controls hydraulic pressure by using an electronic actuator as described above, is called an electro-hydraulic brake system (EHB), that is, an electro-hydraulic brake system.

The electro-hydraulic brake system may easily and individually control braking force generated at each of the wheels, and therefore, the electro-hydraulic brake system may easily implement functions such as electronic stability control (ESC) or an anti-lock brake system (ABS).

In the typical electro-hydraulic brake system, a pump which generates hydraulic pressure is widely used as the electronic actuator. The pump, when motor operates, converts rotational force into straight conveying force to move piston forward and backward and by the piston pressures are applied to brake oil inside a chamber of cylinder, thereby generating hydraulic pressure.

The electro-hydraulic brake system detects, by using a sensor, a pedal stroke occurring when a driver manipulates a pedal, and adjusts braking force for each of the wheels by using hydraulic pressure produced by the pump in accordance with the operation of the motor.

The electro-hydraulic brake system is provided with a pedal simulator that enables the driver to feel pedal pressure like a typical hydraulic brake system.

Therefore, when the driver steps on and pushes the pedal connected to a back-up master cylinder, hydraulic pressure of brake oil in the back-up master cylinder is increased, and the hydraulic pressure of the back-up master cylinder is transmitted to the pedal simulator through a pedal hydraulic line, thereby creating pedal feel.

When the driver steps on a brake pedal, a controller calculates target hydraulic pressure desired by the driver based on a driver pedal input value (brake input value), that is, a pedal stroke value detected by a brake pedal sensor (pedal stroke sensor), allows a pump to produce hydraulic pressure by controlling an operation of the motor in accordance with the calculated target hydraulic pressure, and obtains desired braking force by transmitting the hydraulic pressure produced by the pump to each of the wheel cylinders.

U.S. Patent Publication No. 2014-0224525 (hereinafter, referred to as Patent Document 1) discloses an electric brake capable of controlling four wheels by using a single motor.

Patent Document 1 discloses a brake system that includes a main motor which controls the four wheels during a normal operation, and a plurality of valves which is installed on a hydraulic line of each of the vehicle wheels. In particular, Patent Document 1 discloses an auxiliary motor installed to cope with a failure of the main motor when the main motor breaks down. The auxiliary motor, which copes with a failure of the main motor, is operated only when the main motor breaks down, which adversely affects a vehicle weight and manufacturing costs.

There is a problem in that it is necessary to adopt a separate brake system for implementing an electric parking brake function in addition to an operation of controlling braking pressure for each of the vehicle wheels.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a brake system for a vehicle which is configured for simplifying a complicated brake system structure including a plurality of valve elements and effectively controlling braking pressure for each vehicle wheel. The present invention, in various aspects, has also been made in an effort to provide a brake system for a vehicle which provides a fail-safe mode that copes with the occurrence of a failure of a brake system.

Various aspects of the present invention are directed to providing a brake system for a vehicle, the brake system including: a brake input device which applies a brake input of a driver; a brake actuator which generates braking hydraulic pressure; a wheel cylinder which generates braking force for each vehicle wheel by the braking hydraulic pressure generated by the brake actuator; and a hydraulic pressure supply line which connects the brake actuator and the wheel cylinder, in which the brake actuator includes a main pump device by which braking force is applied, and a sub control device for adjusting the braking force applied by the main pump device.

In an exemplary embodiment, the main pump device may include: a two-stage structured main piston which has a small diameter portion and a large diameter portion; a first housing which has a two-stage structured internal space corresponding to the shape of the main piston; and a main motor which provides driving power for moving the main piston forward or backward thereof.

In another exemplary embodiment, a first chamber, which is pressed by the small diameter portion, and a second chamber, which is pressed by the large diameter portion, may be formed in the first housing.

In still another exemplary embodiment, a hollow portion may be formed at one end portion of the main piston, and a spring member may be disposed in the hollow portion.

In yet another exemplary embodiment, the main pump device may further include a first transmission member positioned between the main piston and the main motor, and the first transmission member may be configured to convert rotational force of the main motor into straight conveying force.

In still yet another exemplary embodiment, the first transmission member may be a combination of a screw and a nut.

In a further exemplary embodiment, the sub control device may include: a second housing which has an internal space; a sub piston which is disposed to be movable forwards and backwards in the second housing; and a sub motor which provides driving power for moving the sub piston forward or backward thereof.

In another further exemplary embodiment, a third chamber and a fourth chamber, which are defined by the sub piston, may be formed in the second housing, the third chamber may be connected to the first chamber, and the fourth chamber may be connected to the second chamber.

In still another further exemplary embodiment, the first housing and the second housing may be integrally formed, and a first flow path for connecting the first chamber and the third chamber and a second flow path for connecting the second chamber and the fourth chamber may be formed in the housings.

In yet another further exemplary embodiment, the sub control device may further include a second transmission member positioned between the sub piston and the sub motor, and the second transmission member may be configured to convert rotational force of the main motor into straight conveying force.

In still yet another further exemplary embodiment, the second transmission member may be a combination of a screw and a nut.

In a still further exemplary embodiment, at least one through hole, which selectively connects the first chamber and a reservoir hydraulic line extending from an oil reservoir, may be formed in the small diameter portion of the main piston.

In a yet still further exemplary embodiment, the main piston and the first transmission member may be configured to be separable from each other, and when the main motor breaks down, the main piston and the first transmission member may be separated by a pedal effort provided by a driver to form braking hydraulic pressure.

In a yet still further exemplary embodiment, the main pump device may be connected to a master cylinder through a pedal hydraulic line, and a normally open valve may be disposed in the pedal hydraulic line.

In a yet still further exemplary embodiment, the brake actuator may be connected to a front wheel or a rear wheel, the third chamber may be connected to one wheel cylinder of left and right wheel cylinders of the vehicle wheels connected through the hydraulic pressure supply line, and the fourth chamber may be connected to the other wheel cylinder through the hydraulic pressure supply line.

In a yet still further exemplary embodiment, the brake system may further include a controller for controlling the brake actuator.

In a yet still further exemplary embodiment, the controller may control the sub motor to adjust a position of the sub piston and thus to increase pressure in the third chamber or the fourth chamber to produce a difference between left and right braking forces.

In a yet still further exemplary embodiment, when the main pump device breaks down, the controller may produce emergency braking force by controlling the sub motor to adjust a position of the sub piston and thus to increase pressure in the third chamber or the fourth chamber.

In a yet still further exemplary embodiment, an area of the small diameter portion in the first chamber is equal to an area of the large diameter portion in the second chamber.

In a yet still further exemplary embodiment, sealing members may be inserted into the first chamber and the second chamber between an internal of the housing and the main piston, respectively.

According to the exemplary embodiment of the present invention, braking pressure for the respective vehicle wheels may be independently controlled by the two motors, and as a result, independent control performance for each vehicle wheel is improved at the time of performing an ABS or ESC.

According to an exemplary embodiment of the present invention, since independent control for each vehicle wheel is enabled without installing a plurality of valves, it is possible to simplify a structure of the brake system and reduce valve operation noise, which leads to a reduction in noise caused by vehicle braking.

According to the exemplary embodiment of the present invention, it is possible to prepare for an electrical failure in the brake system or a motor failure without adding a separate configuration, and thus to improve durability in respect to a failure of the brake system.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
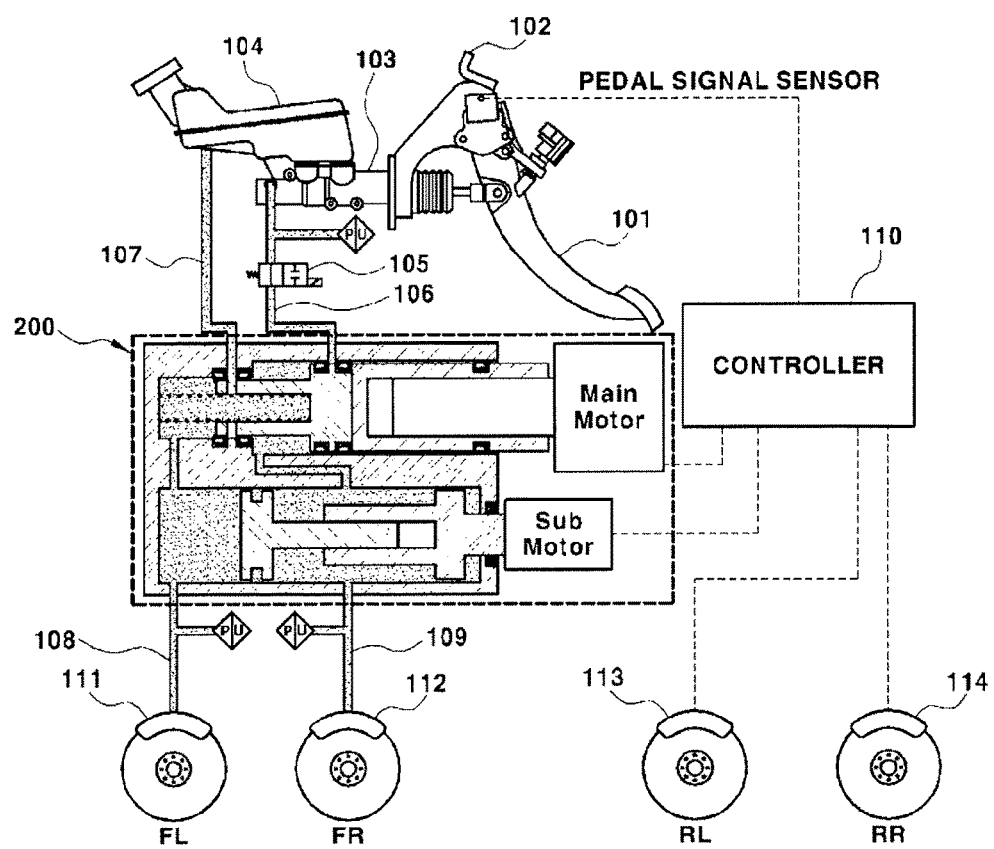
FIG. 1 is a view schematically illustrating a configuration of a brake system for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a brake system for a vehicle according to an exemplary embodiment of the present invention will be described in detail with reference to the accompanying drawings.

Figure 2:
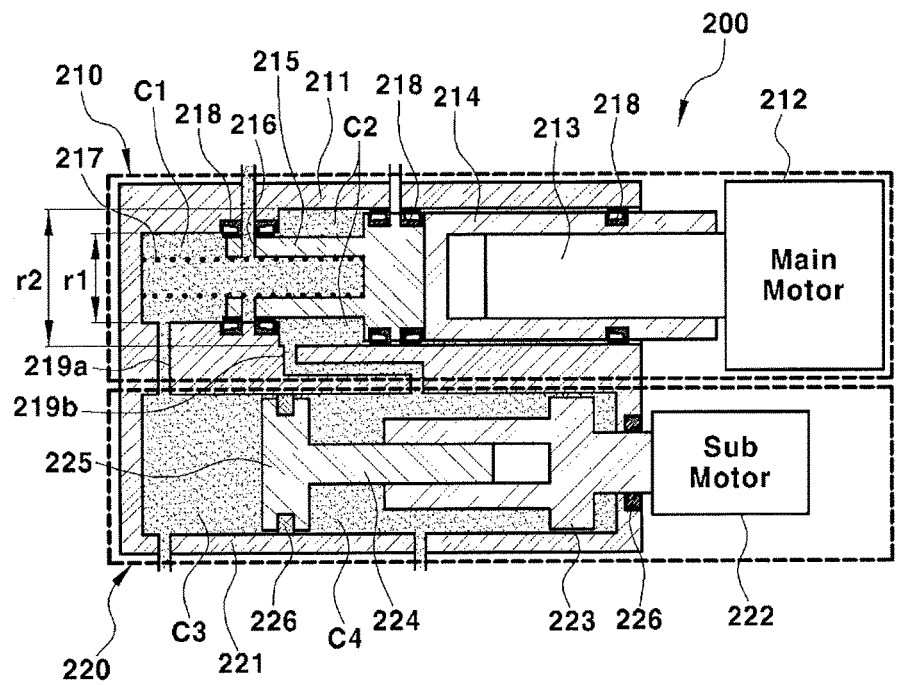
FIG. 2 is a view illustrating a brake actuator according to the exemplary embodiment of the present invention.

FIG. 1 is a view schematically illustrating a configuration of the brake system for a vehicle according to the exemplary embodiment of the present invention, and FIG. 2 illustrates only a brake actuator in an example in FIG. 1.

As illustrated in FIG. 1, the brake system for a vehicle of the present invention includes a brake pedal 101 which is a brake input device manipulated by a driver to brake the vehicle, a brake input detecting sensor 102 which detects a brake input value through the brake pedal 101, a brake actuator 200 which produces braking hydraulic pressure, wheel cylinders 111 and 112 which receive the braking hydraulic pressure produced by the brake actuator 200 and generate braking force for the respective vehicle wheels, hydraulic pressure supply lines 108 and 109 which connect the brake actuator 200 with the wheel cylinders 111 and 112 and supply the braking hydraulic pressure generated by the brake actuator 200 to the respective wheel cylinders 111 and 112, and a controller 110 which controls an operation of the brake actuator 200 to generate target braking pressure based on a signal from the brake input detecting sensor 102.

The controller 110 is configured to control a main motor 212 and a sub motor 222 in the brake actuator 200 for front wheels, and may also control an electric brake for a rear wheel in addition to the electric brake for the front wheels.

The brake pedal 101 is connected to a master cylinder 103 connected to an oil reservoir 104 that stores brake oil, and when a driver pushes the brake pedal 101, hydraulic pressure is formed through the master cylinder 103 and a pedal hydraulic line 106 connected to the master cylinder 103. In the instant case, a pedal simulator, which provides appropriate pedal feel to the driver when the driver steps on the brake pedal 101, may be embedded in the master cylinder 103.

A cut valve 105 may be disposed in the pedal hydraulic line 106, and the cut valve 105 may be configured as a normally open valve. Therefore, when no braking operation is performed, the cut valve 105 is in an opened state, but when the braking operation is performed, the cut valve 105 is closed, and the hydraulic pressure is not transmitted to the brake actuator 200. In addition, a reservoir hydraulic line 107, which connects the oil reservoir 104 and the brake actuator 200, may be provided.

Meanwhile, the brake system for a vehicle according to the present exemplary embodiment is characterized by including the brake actuator 200 for supplying main braking force and controlling a difference between left and right braking forces.

The brake actuator 200 according to the present exemplary embodiment is configured to control front wheel braking force by controlling electrical force that operates the motor. The brake actuator 200 is characterized by being configured to set different braking forces to a front left wheel and a front right wheel when controlling the braking force for the front wheels, that is, to adjust a difference between braking forces for the left and right wheels of the front wheels. To this end, in the exemplary embodiment of the present invention, the brake actuator 200 is configured to include a main pump device 210 connected to the main motor 212 and a sub control device 220 connected to the main pump device 210.

The brake actuator 200 includes the main pump device 210 for controlling main braking force for the front wheels, wherein the main pump device 210 includes the main motor 212 that provides driving power for generating the main braking force. The main motor 212 is configured to press a main piston 215 that moves in a housing 211 in the main pump device 210, and to this end, a transmission member is provided between the main motor 212 and the main piston 215. The transmission member is configured to transmit rotational force of the main motor 212 to the main piston 215 so that the main piston 215 may pressurize a fluid in the housing 211.

For example, the transmission member is configured to convert rotational force of the main motor 212 into straight conveying force, and as illustrated in FIG. 2, and has a combination of a screw 213 connected to a rotation shaft of the main motor 212, and a nut 214 fastened to the screw 213. With the aforementioned configuration, the rotational force of the main motor 212 is transmitted to the main piston 215, and as illustrated in FIG. 2, when the main motor 212 rotates forward, the main piston 215 moves leftward.

Figure 7:
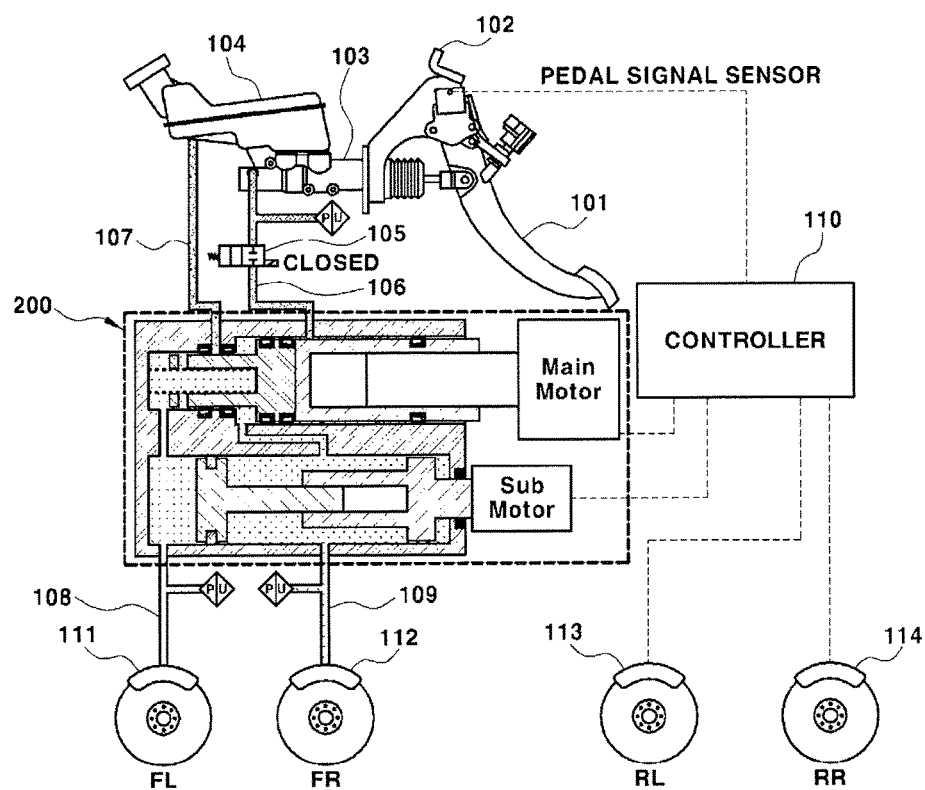
FIG. 7 is a view illustrating a state in which the respective components of the brake system are operated when the left and right braking forces are independently controlled, when the left braking force is greater than the right braking force.

The main piston 215 may be configured to be separated from the transmission member. The reason why the transmission member and the main piston 215 are configured to be separated from each other as described above is to implement an emergency braking function. That is, in a case in which an electrical failure occurs in the brake system, the piston needs to be pressed by use of a brake input of the driver. To this end, in the present exemplary embodiment of the present invention, when an emergency braking operation is performed, the transmission member and the main piston 215 are separated from each other by hydraulic pressure produced by a pedal input of the driver, and a space between the transmission member and the main piston 215 is filled with oil, as illustrated in FIG. 7. Therefore, the main piston 215 is pressed by hydraulic pressure produced between the transmission member and the main piston 215, producing braking pressure.

Figure 3:
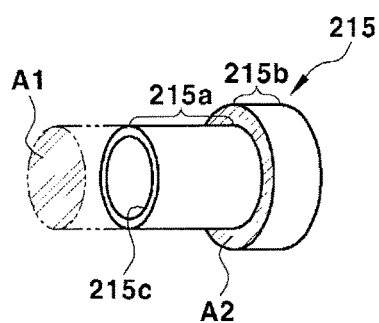
FIG. 3 is a view illustrating a main piston of the brake actuator.

Meanwhile, according to the exemplary embodiment of the present invention, the main piston 215 has a cylinder shape divided into two portions having a stepped portion. This example is illustrated in FIG. 3, and a structure, which has a small diameter portion 215a and a large diameter portion 215b to define the aforementioned stepped portion, is referred to as a two-stage structure in the present specification. The shape of the two-stage structure is not limited to the cylinder shape, but may be used by being variously modified to structures including a polygonal structure of which each edge portion is rounded. In addition, the terms the "small diameter portion 215a" and the "large diameter portion 215b" are not limited to a term that means a diameter, but the terms may mean an average distance from a center to an external surface. The small diameter portion 215a means a center region of the two-stage structure, and the large diameter portion 215b means an external region exposed to the outside of the small diameter portion 215a. That is, in an example illustrated in FIG. 3, an overall area, which correspond to an area A1 from the center, is defined as the small diameter portion 215a, and a doughnut shaped portion at an external circumference of the small diameter portion 215a, that is, a portion, which correspond to an area A2, is defined as the large diameter portion 215b.

The main piston 215 is configured to move forwards and backwards in the housing 211 of the main pump device 210, and in the instant case, an internal of the housing 211 is divided into two chambers by the main piston 215. That is, considering the example in which the cylinder internal space is provided as illustrated in FIG. 2, a first cylindrical space having a first diameter r1 and a second cylindrical space having a second diameter r2 are formed in the housing 211.

Meanwhile, the main piston 215 is configured to pressurize a fluid in the respective spaces while moving in the housing 211. Therefore, in the present exemplary embodiment of the present invention, the main piston 215 is characterized by having a two-stage cylinder shape having the small diameter portion 215a corresponding to the first diameter and the large diameter portion 215b corresponding to the second diameter. In addition, spaces in the housing 211 also have a two-stage cylinder shape due a first space and a second space.

Referring to FIG. 2, the small diameter portion 215a of the main piston 215 extends to the first space having the first diameter in the housing 211, and the large diameter portion 215b moves in the second space having the second diameter in the housing 211. At least one sealing member 218 is disposed in each of the spaces between the main piston 215 and the internal of the housing 211. Therefore, the main pump device 210 includes a first chamber C1 which is defined by the first space of the housing 211 and the small diameter portion 215a of the main piston 215, and a second chamber C2 which is defined by the second space of the housing 211, an external circumferential surface of the small diameter portion 215a of the main piston 215, and an upper surface of the large diameter portion 215b.

A pressing area of the piston may be considered to set diameters of the small diameter portion 215a and the large diameter portion 215b of the main piston 215. As illustrated in FIG. 3, assuming that A1 is an area where the small diameter portion 215a is exposed to the first chamber C1, and A2 is an area where the upper surface of the large diameter portion 215b is exposed to the second chamber C2 except for the small diameter portion 215a, that is, an area having a loop shape, the two areas may be set to be equal, that is, A1=A2. In the case where the exposed areas of the small diameter portion 215a is equal to the large diameter portion 215b as described above, the amounts of fluid in the chambers, which is pressurized by the movement of the main piston 215, become fixed, and as a result, the fixed force is transmitted to the wheel cylinders 111 and 112, as the main piston moves, even though additional control is not performed.

The small diameter portion 215a may be configured to have a hollow portion 215c formed at one end portion thereof to have a hollow cylinder structure, and a spring member 217 is mounted in the hollow portion 215c. The spring member 217 may provide restoring force for allowing the main piston 215 to return after the main piston 215 moves forward thereof.

Figure 5:
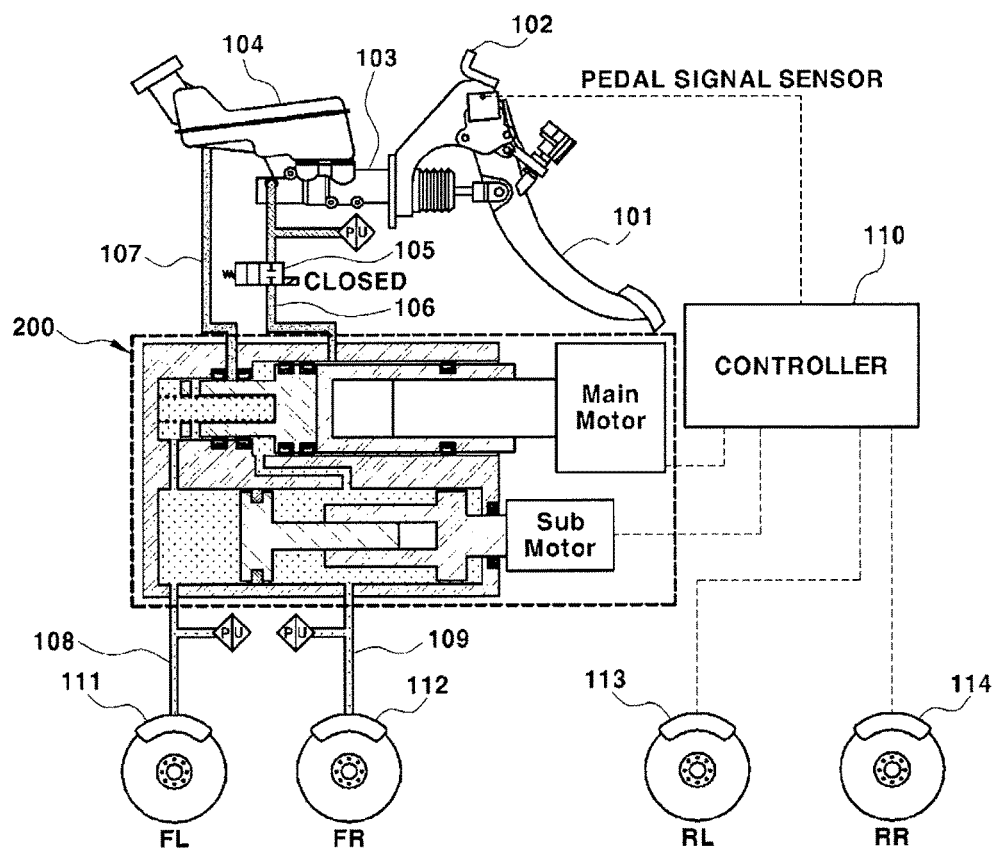
FIG. 5 is a view illustrating a state in which the respective components of the brake system are operated when left and right braking forces are equally controlled.

At least one through hole 216 is formed in an external surface of the small diameter portion 215a to be directed toward the center, and the through hole 216 is configured to connect or disconnect the reservoir hydraulic line 107 and the first chamber C1. That is, as illustrated in FIG. 1, in a case in which the main piston 215 moves forward in a state in which the through hole 216 of the small diameter portion 215a is matched with the reservoir hydraulic line 107 and a flow path on the housing which is connected to the reservoir hydraulic line 107, the through hole 216 and the reservoir hydraulic line 107 are misaligned, such that as illustrated in FIG. 5, the external circumferential surface of the small diameter portion 215a of the main piston 215 blocks the reservoir hydraulic line 107. Therefore, the through hole 216 of the small diameter portion 215a selectively connects the reservoir hydraulic line 107 and the first chamber C1 as the main piston 215 moves forward or backward thereof.

Although not illustrated, a guide protrusion and a guide groove corresponding to the guide protrusion may be formed on internal walls of the main piston 215 and the housing 211, and with these components, the main piston 215 may move forwards and backwards without being rotated.

Meanwhile, the sub control device 220 is provided at a lower side of the main pump device 210. The sub control device 220 also has two chambers, and the chambers are connected to the chambers of the main pump device 210, respectively.

The sub control device 220 has a sub motor 222, and a sub piston 225 that moves by the sub motor 222. In addition, the sub control device 220 has a housing 221 having therein a cylinder shaped internal space, and as illustrated in FIG. 2, the housing 221 of the sub control device 220 may be formed integrally with the housing 211 of the main pump device 210.

The sub piston 225 is configured to be movable in the housing 221, and a sealing member 226 is disposed as illustrated in FIG. 2. Therefore, an internal of the housing 221 is divided into a third chamber C3 and a fourth chamber C4 by the sub piston 225, and as the sub motor 222 rotates, the piston pressurizes a fluid in the third chamber C3 or the fourth chamber C4 while moving forward or backward thereof.

In the instant case, the third chamber C3 and the first chamber C1 are connected to each other so that the fluid may flow therebetween, the fourth chamber C4 and the second chamber C2 are connected to each other so that the fluid may flow therebetween, and to this end, flow paths 219a and 219b between the chambers are formed in the housings, as illustrated in FIG. 2.

The third chamber C3 and the fourth chamber C4 supply hydraulic pressure to the wheel cylinders 111 and 112 of the front left wheel and the front right wheel through the hydraulic pressure supply lines 108 and 109, respectively. Accordingly, when the sub piston 225 moves, a pressure between the third chamber C3 and the fourth chamber C4 is different, and as a result, left and light braking pressures become different from each other. When no braking operation is performed, the sub piston 225 needs to be positioned at a predetermined home position and the sub piston 225 moves forwards and backwards to adjust the left and right braking forces.

For example, FIG. 1 illustrates the sub piston 225 in a state of being positioned at a home position, and when the main braking force is applied by the main motor 212, the left and right braking pressures, which are equal to each other, are formed in the state in which the sub piston 225 is positioned at the home position.

In contrast, to increase the braking pressure for the front left wheel, the sub motor 222 is controlled to increase pressure in the third chamber C3 by moving the sub piston 225 forward to the left. In addition, to increase the braking pressure for the front right wheel, the sub motor 222 is controlled to increase pressure in the fourth chamber C4 by moving the sub piston 225 backward to the right.

The sub piston 225 needs to be configured to be movable forwards and backwards in accordance with the rotation of the sub motor 222, and to this end, the sub piston 225 may include a transmission member for converting rotational force of the motor into straight conveying force and transmitting the conveying force to the piston. According to the exemplary embodiment of the present invention, the transmission member may include a rotating nut portion 223 disposed on a rotation shaft of the sub motor 222, and a conveying screw 224 mounted on a bottom surface of the piston. However, the transmission member of the sub control device 220 is not limited to the example, and any configuration may be applied without limitation as long as the configuration may move the piston forwards and backwards in accordance with the rotation of the motor. For example, the transmission member may be configured by a combination of a screw and a nut which are opposite in position to the nut and the screw in FIG. 2.

In the exemplary embodiment in FIG. 1, the brake actuator 200 for controlling the front wheels is included, and in the case of rear wheel cylinders 113 and 114, electric brakes are disposed on left and right wheels, respectively. Therefore, braking control is performed on the front wheels by the brake actuator 200; brake control is performed on the rear wheels by the electric brakes, such that with the aforementioned configurations, independent control is performed on the respective wheels. However, the configuration, in which the brake actuator 200 including the main pump device 210 and the sub control device 220 is disposed only for the front wheels as illustrated in FIG. 1, is one example, and unlike FIG. 1, the brake actuator 200 may be disposed only for the rear wheels, or the brake actuators 200 may be disposed for the front and rear wheels.

FIG. 4, FIG. 5, FIG. 6, and FIG. 7 illustrate states in which the brake actuator 200 operates depending on the circumstances.

Figure 4:
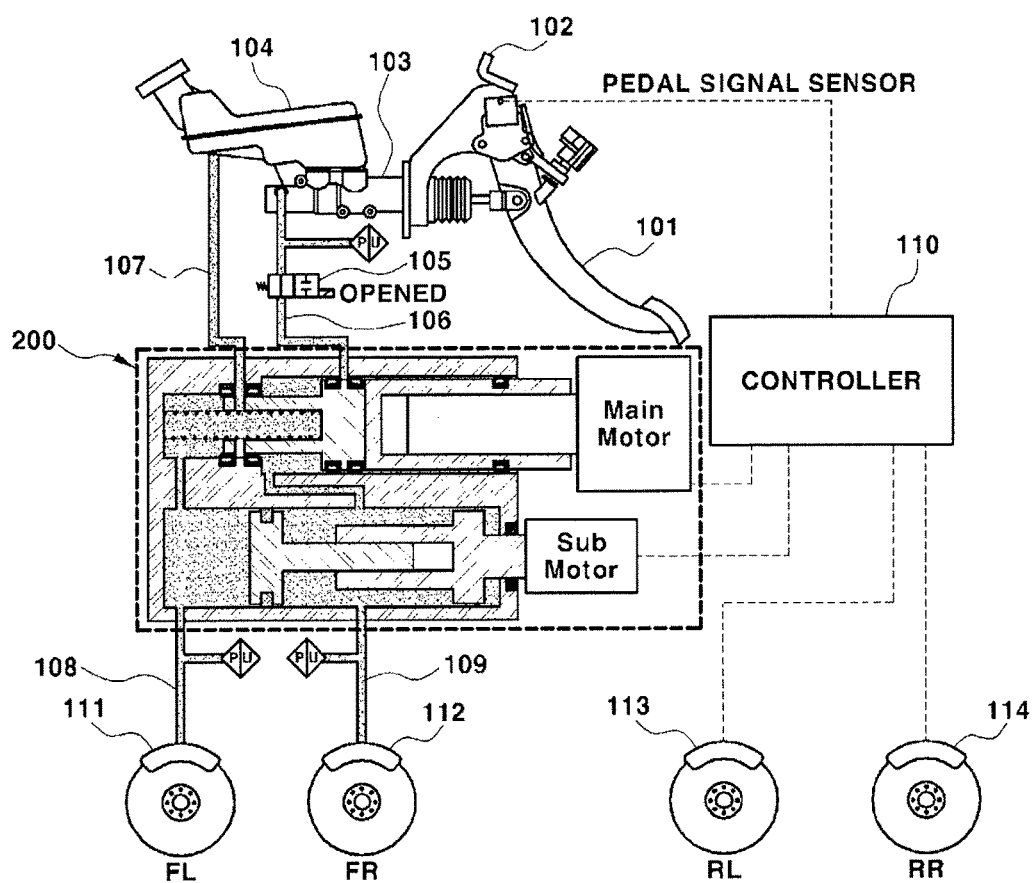
FIG. 4 is a view illustrating a state in which respective components of the brake system are operated when front wheels do not brake.

First, FIG. 4 is a view illustrating a state in which the respective components of the brake system are operated when the front wheel does not brake. When no braking operation is performed, the cut valve 105, which is a normally open valve, is in an opened state, and the main piston 215 and the sub piston 225 are positioned at the home positions. When no braking operation is performed, the through hole 216 is connected to the reservoir hydraulic line 107, and the first chamber C1 is maintained in a state of being connected to the reservoir.

In contrast, when the braking operation is performed while the left and right braking forces are being controlled, the main pump device 210 is operated to transmit the main braking force to the left and right wheels.

That is, as illustrated in FIG. 5, as the main motor 212 is operated, the main piston 215 is moved forward by the screw 213 and the nut 214, and pressurizes the fluid in the first chamber C1 and the second chamber C2. In the instant case, because the sub motor 222 is not operated in this state, the sub piston 225 is positioned at the home position, and pressure in the third chamber C3 and pressure in the fourth chamber C4 are equally changed. Therefore, it is possible to equally maintain braking force for the left and right wheels.

Figure 6:
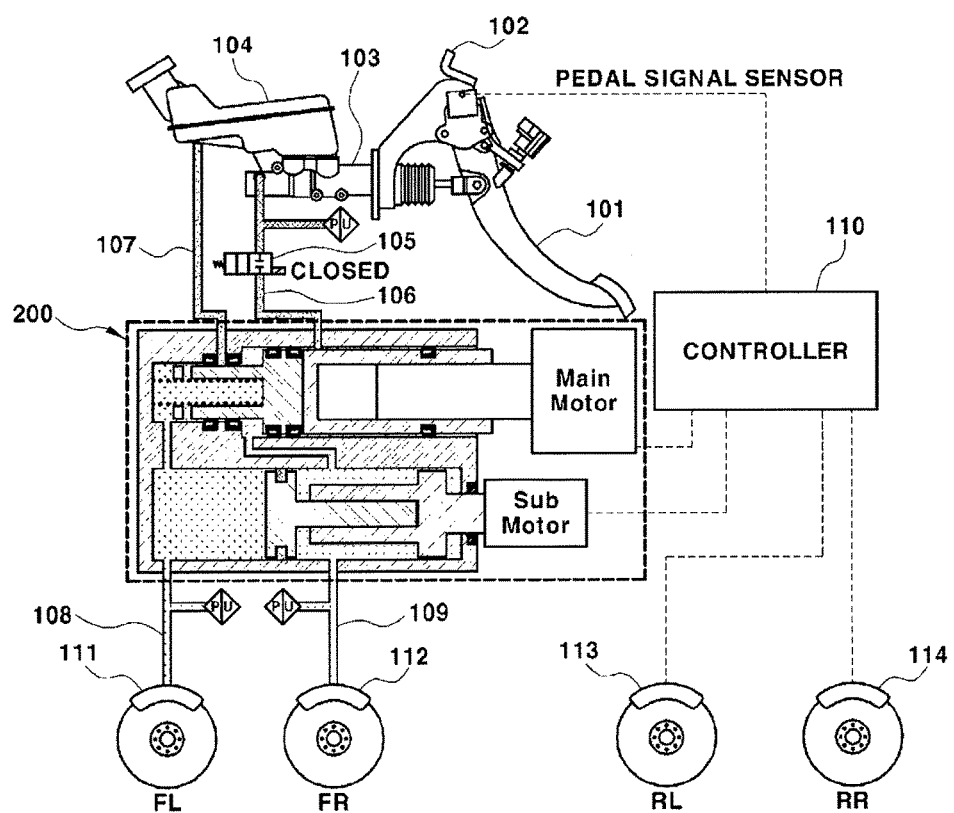
FIG. 6 is a view illustrating a state in which the respective components of the brake system are operated when the left and right braking forces are independently controlled, when the right braking force is greater than the left braking force.

Meanwhile, a case in which the left and right braking forces are differently and independently controlled are illustrated in FIG. 6 and FIG. 7, respectively. FIG. 6 illustrates a case in which higher right braking force is required, and FIG. 7 illustrates a case in which higher left braking force is required.

In a case in which higher right braking force is required, the sub motor 222 is controlled to press the fourth chamber C4 connected to the right wheel as illustrated in FIG. 6. That is, when the brake control is performed, the main motor 212 is operated to form the main braking force, and the sub piston 225 is moved backward by the sub motor 222 to press the fourth chamber C4, increasing pressure. In the instant case, pressure in the third chamber C3 is reduced, and a difference in braking pressure occurs between the left and right wheels in accordance with the increase and decrease in pressure.

In contrast, in a case in which higher left braking force is required, the sub motor 222 is controlled to press the third chamber C3 connected to the left wheel as illustrated in FIG. 7. In the instant case, as the sub piston 225 moves forward, pressure in the third chamber C3 is increased, and pressure in the fourth chamber C4 is decreased. Therefore, the left braking force is adjusted to relatively higher braking force.

Meanwhile, according to the exemplary embodiment of the present invention, a fail-safe operation is enabled by the aforementioned configuration of the brake actuator 200.

Figure 8:
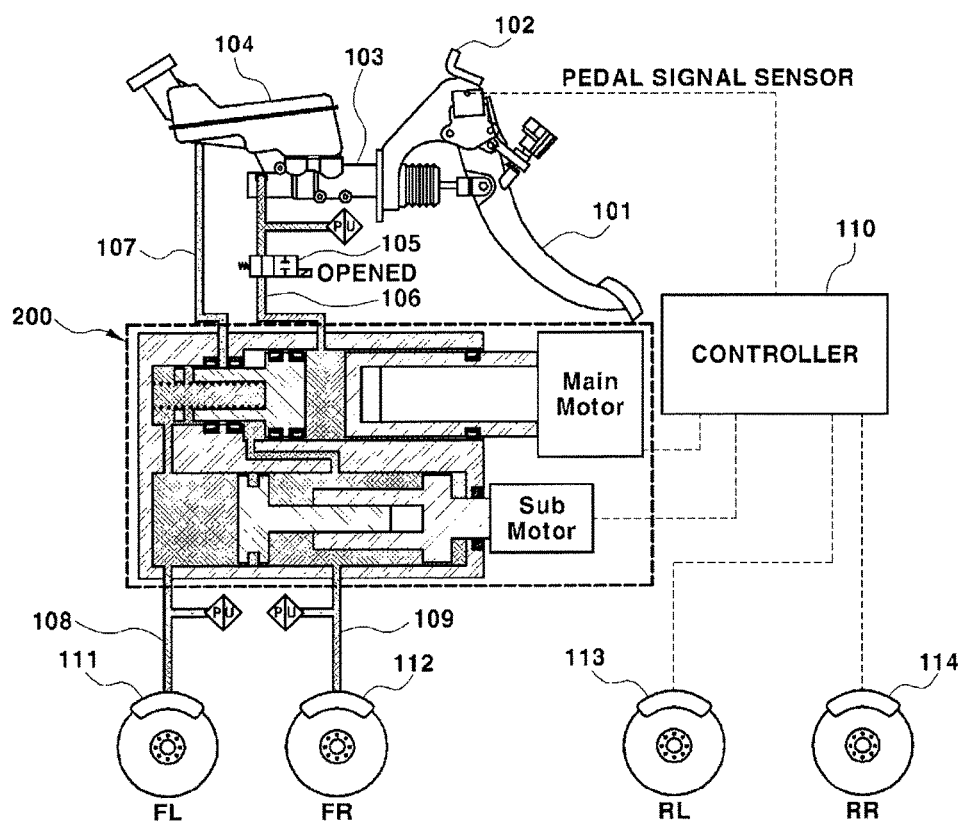
FIG. 8 is a view illustrating a state in which the respective components of the brake system are operated in accordance with a brake input of a driver when a failure occurs in an electrical system.

In this regard, FIG. 8 illustrates a state in which the braking operation is performed in accordance with a brake input of the driver when a failure occurs in the electrical system. As described above, when a typical braking operation is performed, the main piston 215 presses the first chamber C1 and the second chamber C2 by being pressed by the main motor 212, forming the main braking force.

However, in a case in which an electrical failure occurs in the brake system, for example, and thus electric power cannot be supplied such that the main motor 212 and the sub motor 222 cannot be controlled, the braking operation is performed by a brake input of the driver. That is, as illustrated in FIG. 8, when an electrical failure occurs, since the cut valve 105, which is a normally open valve, is in an opened state, a pedal effort of the driver may be transmitted to the brake actuator 200. Therefore, as the pedal effort of the driver is transmitted to the brake actuator 200, the oil flows into a space between the main piston 215 and the transmission member, that is, between the main piston 215 and the nut 214 in FIG. 8. Therefore, the main piston 215 and the transmission member are separated by force produced when the driver steps on the pedal, and in the instant case, the main piston 215 is pressed by the produced hydraulic pressure, producing braking pressure.

Meanwhile, according to an exemplary embodiment of the present invention, braking force may be automatically controlled when some motors break down. This automatic control is useful in a state in which the driver cannot perform the braking operation including when the vehicle autonomously travels.

When any one of the main motor 212 and the sub motor 222 is operable, selective solutions may be made depending on which motor is operable. For example, in a case in which the sub motor 222 breaks down, only the function of setting a braking pressure difference cannot be applied. Therefore, the braking force is ensured by equally maintaining the left and right braking forces and operating the main motor 212. In the instant case, the main pump device is operated like the case in which the left and right braking forces are equally controlled as illustrated in FIG. 5, and because the sub control device is not operated, the ABS control cannot be performed, In contrast, in a case in which the main motor 212 breaks down, the operation of the main pump device 210 cannot be performed. Therefore, the controller 110 brakes only one of the front left wheel and the front right wheel by operating the sub motor 222, and eliminates torque unbalance by controlling the braking operation for the rear wheels.

Figure 9:
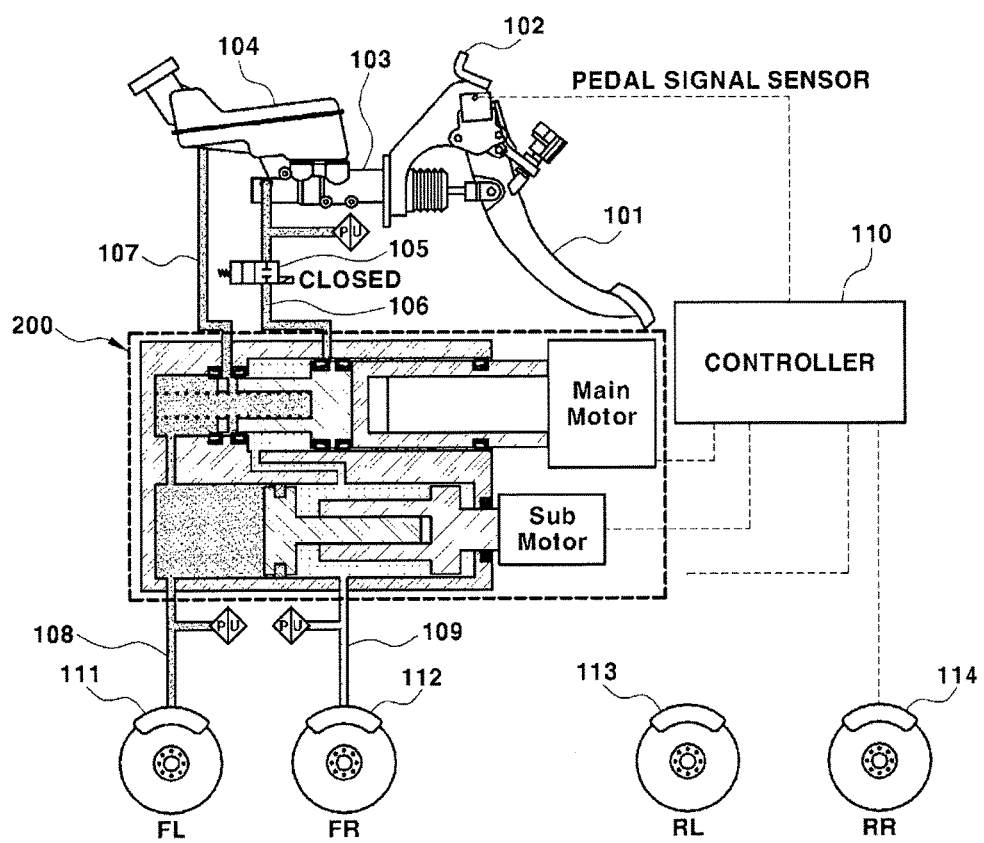
FIG. 9 is a view illustrating a state in which the respective components of the brake system are operated when main motor breaks down while the vehicle autonomously travels.

For example, as an example illustrated in FIG. 9, when the sub piston 225 is moved forward by rotating the sub motor 222 forward, the braking force is produced only for the left front wheel, and in the instant case, compensation control is performed by performing the braking operation on the right rear wheel so that the vehicle is not turned. On the contrary, the sub piston 225 may be moved backward by rotating the sub motor 222 reversely, and in the instant case, the braking force is produced only for the right front wheel by the sub motor 222.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake system for a vehicle, the brake system comprising:
    a brake input device configured to apply a brake input of a driver;
    a brake actuator configured for generating braking hydraulic pressure;
    wheel cylinders configured for generating braking force for each vehicle wheel by the braking hydraulic pressure generated by the brake actuator; and
    a hydraulic pressure supply line connecting the brake actuator and the wheel cylinders,
    wherein the brake actuator includes a main pump device by which braking force is applied, and a sub control device configured for adjusting the braking force applied by the main pump device, and
    wherein the sub control unit includes:
        a second housing having an internal space therein;
        a sub piston which is disposed in the second housing to be movable forwards and backwards therein; and
        a sub motor configured for providing driving power for moving the sub piston forward or backward thereof.

2. The brake system according to claim 1, wherein the main pump device includes:
    a two-stage structured main piston having a small diameter portion and a large diameter portion;
    a first housing having a two-stage structured internal space corresponding to a shape of the main piston; and
    a main motor configured for providing driving power for moving the main piston forward or backward thereof.

3. The brake system according to claim 2, wherein in the first housing a first chamber being pressed by the small diameter portion and a second chamber being pressed by the large diameter portion are formed.

4. The brake system according to claim 2, wherein the main piston has a hollow portion formed at one end portion thereof and in the hollow portion a spring member is disposed.

5. The brake system according to claim 2, wherein the main pump device further includes a first transmission member disposed between the main piston and the main motor, and the first transmission member is configured to convert rotational force of the main motor into straight conveying force.

6. The brake system according to claim 5, wherein the first transmission member includes a screw and a nut.

7. The brake system according to claim 1, wherein in the second housing a third chamber and a fourth chamber are formed and are defined by the sub piston, wherein the third chamber is connected to the first chamber and the fourth chamber is connected to the second chamber.

8. The brake system according to claim 7, wherein the first housing and the second housing are integrally formed and have a first flow path for connecting the first chamber and the third chamber and a second flow path for connecting the second chamber and the fourth chamber therein.

9. The brake system according to claim 1, wherein the sub control device further includes a second transmission member disposed between the sub piston and the sub motor, and the second transmission member is configured to convert rotational force of the main motor into straight conveying force.

10. The brake system according to claim 9, wherein the second transmission member includes a screw and a nut.

11. The brake system according to claim 3, wherein the small diameter portion of the main piston has at least one through hole, which is configured to selectively connect the first chamber and a reservoir hydraulic line extending from an oil reservoir, formed therein.

12. The brake system according to claim 5, wherein the main piston and the first transmission member are configured to be separable from each other, wherein, when the main motor breaks down, the main piston and the first transmission member are separated by a pedal effort provided by a driver to generate braking hydraulic pressure.

13. The brake system according to claim 12, wherein the main pump device is connected to a master cylinder through a pedal hydraulic line, and wherein the pedal hydraulic line has a normally open valve disposed therein.

14. The brake system according to claim 7, wherein the brake actuator is connected to a front wheel or a rear wheel; the third chamber is connected to one of left and right wheel cylinders of the vehicle wheels connected through the hydraulic pressure supply line; and the fourth chamber is connected to the other wheel cylinder through the hydraulic pressure supply line.

15. The brake system according to claim 7, further including:
   a controller configured for controlling the brake actuator.

16. The brake system according to claim 15, wherein the controller is configured to control the sub motor to adjust a position of the sub piston, and as a result, pressure inside the third chamber or the fourth chamber is increased to produce a difference between left and right braking forces.

17. The brake system according to claim 15, wherein the controller is configured to produce emergency braking force when the main pump device breaks down by controlling the sub motor to adjust a position of the sub piston and thus to increase pressure in the third chamber or the fourth chamber.

18. The brake system according to claim 3, wherein a predetermined area of the small diameter portion in the first chamber is equal to a predetermined area of the large diameter portion in the second chamber.

19. The brake system according to claim 3, wherein sealing members are configured to be inserted into the first chamber and the second chamber between an interior of the housing and the main piston, respectively.

* * * * *